(12) United States Patent
Henrick

(10) Patent No.: US 6,779,020 B1
(45) Date of Patent: Aug. 17, 2004

(54) ESTABLISHING COMMUNICATIONS BETWEEN A CALLING SERVER AND A CALLED SERVER ACCORDING TO SERVICES SUBSCRIBED BY THEIR RESPECTIVE CALLING AND CALLED PARTIES

(75) Inventor: Robert F. Henrick, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 543 days.

(21) Appl. No.: 09/618,428

(22) Filed: Jul. 18, 2000

(51) Int. Cl.[7] .......................... G06F 15/16; H04L 12/66
(52) U.S. Cl. ...................... 709/206; 709/205; 370/352; 370/389; 379/209.01
(58) Field of Search ................................. 709/201–206; 379/88.12, 201.03, 201.08, 209.01, 218.01, 219; 370/352, 237, 389

(56) References Cited

U.S. PATENT DOCUMENTS

| | | | | |
|---|---|---|---|---|
| 6,075,783 A | * | 6/2000 | Voit | 370/352 |
| 6,169,795 B1 | * | 1/2001 | Dunn et al. | 379/209.01 |
| 6,185,288 B1 | * | 2/2001 | Wong | 379/219 |
| 6,459,782 B1 | * | 10/2002 | Bedrosian et al. | 379/201.08 |
| 6,493,431 B1 | * | 12/2002 | Troen-Krasnow et al. | 379/88.12 |
| 6,584,186 B1 | * | 6/2003 | Aravamudan et al. | 379/201.03 |
| 2002/0057783 A1 | * | 5/2002 | Kredo et al. | 379/218.01 |

* cited by examiner

Primary Examiner—Wen-Tai Lin

(57) ABSTRACT

The facilities of a communications system are enhanced by providing a server that operates in behalf of a calling party and a server that operates in behalf of a called party to respectively establish communications between the calling and called parties via a communications network according to communications services respectively subscribed to by the calling and called parties.

17 Claims, 3 Drawing Sheets

ESTABLISHING COMMUNICATIONS BETWEEN A CALLING SERVER AND A CALLED SERVER ACCORDING TO SERVICES SUBSCRIBED BY THEIR RESPECTIVE CALLING AND CALLED PARTIES

FIELD OF THE INVENTION

The invention relates to enhanced telecommunications services, and more particularly relates to telecommunications services provided over the Internet.

BACKGROUND OF THE INVENTION

A key feature of intelligent communications networks is the identification of the calling party using, for example, a telephone number assigned to the calling party. Currently, such networks, e.g., the well-known Public Switched Telephone Network (PSTN), presents the caller's address in a conventional manner as a "caller ID" or ANI to a receiving, or called party via a caller ID device or ISDN terminal. Aimed with such information, the called party may then decide whether or not to answer the call. Network services have been implemented to block calls that originate from a caller who has blocked the transmission of the caller ID. Moreover, sophisticated commercial call distribution applications, such as a call center, use such calling-party information, to prioritize incoming calls, route incoming calls deemed important to particular representatives and present those representatives with information relating to the respective calling party. Further, personal-telephone-call screening services use calling-party information to route an incoming to the called party's current location or to a messaging service.

The amount of calling-party information that may be routed along with the associated call has increased as a result of traditional PSTN synchronous communications migrating to more robust modes of packet networks. For example, one prior Personal Computer (PC) application allows a calling user to mix audio, video and text, in which a calling party is identified by a label they have selected and which is transmitted to the called-party's PC. The receiving PC displays the identity of the party using that label. Some messaging systems allow a caller to use similar procedures. For example, the called party may specify how calls from different callers ought to be handled. In both PSTN and packet networks, calls are transmitted through the network with two fields respectively bearing calling and called party identifiers.

Call processing services help a caller to manage their outbound telephone calls as well as inbound calls. Outbound call management services can assist the user in placing a call using different services, such as PC click to dial, voice dialing, or establishing a conference call. For example, a caller may use his/her PC or voice to identify whom they want to call and the outbound service responds by supplying the called address to the network. Inbound call services help a caller manage incoming calls, such as by providing a single reach number, call screening, call waiting, etc. For example, a user may use voice screening to decide whether to answer a call. Recent "unified" services help a user with other forms of communications, including E-mail, facsimile, and other text messaging. For example, unified messaging is typically an inbound service that stores and retrieves all messages and may provide outbound characteristics, such as returning a message with a telephone call. Services that provide both inbound and outbound services are desirable. For example, a subscriber may forward a message to another such subscriber or return a message with a message when accessing stored messages, as is similarly done in voice messaging. However, there is currently no way for generalized communications services respectively serving the calling and called parties to locate and interact with each other to provide enhance calling features/capabilities if both parties do not subscribes to these services. Consequently, such enhanced calling/called features/ capabilities could not be invoked.

SUMMARY OF THE INVENTION

Based on the foregoing, I have recognized that there is a need to further extend calling party and called party identity information so that it includes other key information useful to services representing each user or each end of a call. Such services may include outbound call management and inbound call management that employ one or more transmission media, which may result in direct synchronous or asynchronous communications or messaging. In accordance with one aspect of the invention, each service may reside solely in the network, Customer Premises Equipment (CPE), or be coordinated between the two. This is accomplished by transmitting additional field information to allow the services to locate one another and exchange information that will assist the services in completing their respective functions. The information field, more particularly, provides the network address of a calling party's Service Information Server (SIS) that the services may access remotely to obtain a specification of each other's service capabilities. In accordance with another aspect of the invention, a service may query a database associated with the other party to obtain information relating to other party so that the service may properly execute their respective party's subscription of services. The subscription of services may include, for example, (a) a personalized rolodex card; (b) capabilities of the user's/subscriber's CPE; (c) address of the other CPE; (d) the subscriber's public encryption key; (e) authentication of the subscriber's identity; (f) mailbox address; (g) call priority; and (h) a calendar, as well as other features/services and extension thereof, as will be explained below.

These and other aspects of the invention will be appreciated from the following detailed description read in conjunction with accompanying drawings.

DETAILED DESCRIPTION

Figure 1:
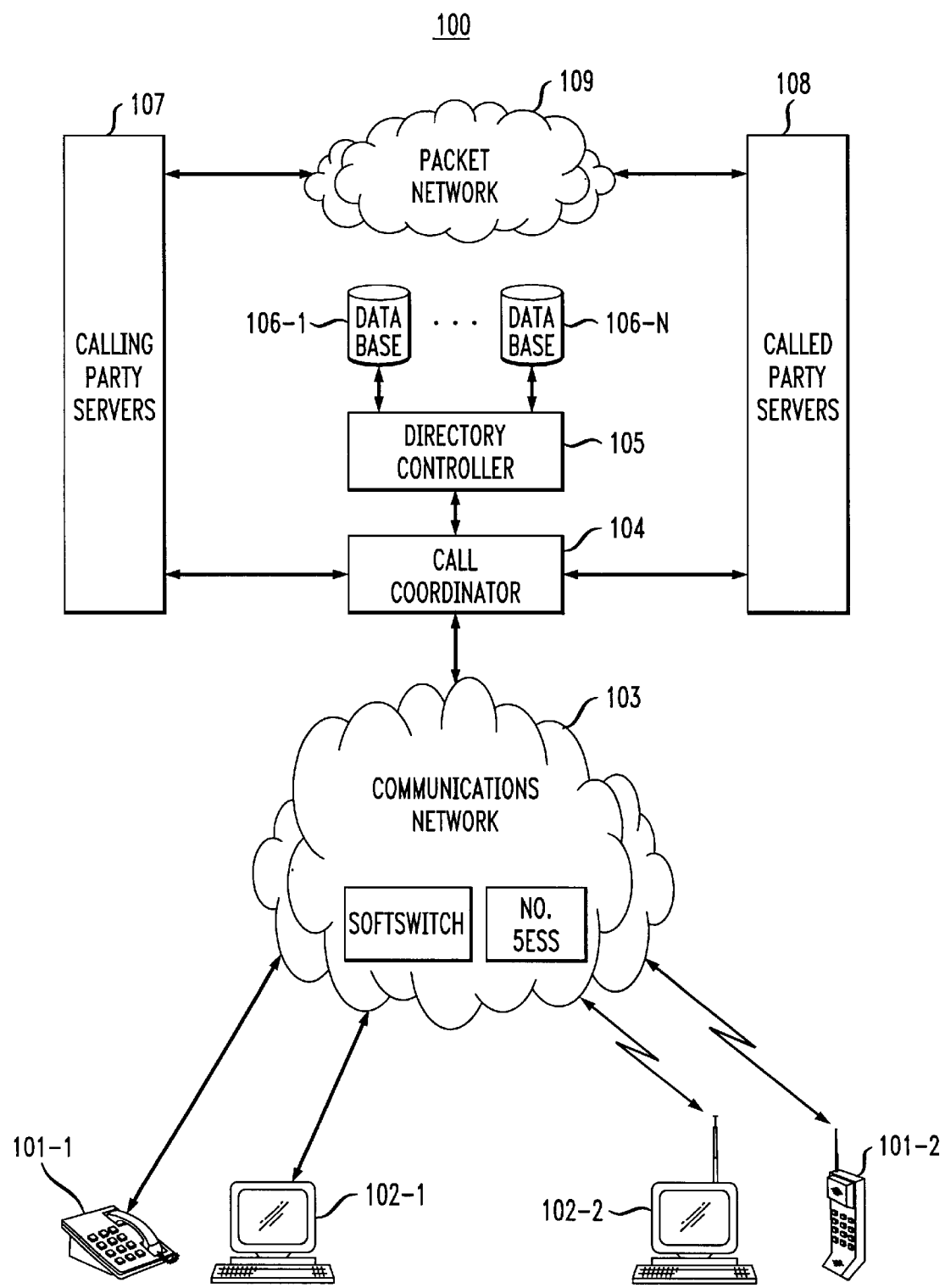
FIG. 1 is broad block diagram of a communications system in which the principles of the invention may be practiced.

An illustrative communications system 100 capable of establishing communications between two parties, in which one party places the communications (referred to herein as the calling party) and the other party receives the communications (referred to herein as the called party) is shown in FIG. 1. System 100, more particularly, implements a method that controls communications over a variety of networks including Public Switched Telephone Networks (PSTN), cellular and packet networks using a variety of telephone equipments, computers, wireless devices and Customer Premises Equipment (CPE) such as Internet terminals, represented in the FIG. by telephone terminal 101-1, wireless terminal 101-2, PC 102-1 and wireless PC 102-2.

Assume that the calling party in a conventional manner places a call from terminal 101-1 to the called party associated with wireless terminal 101-2. The call request is received by communications network 103 in a conventional manner, which may be interconnected or "gatewayed" to another network connected to the called station. Communications network 103 upon receipt of the call, passes it to call coordinator 104 for processing. That is, the set up and completion of the call is managed by a software process running in a network element designated as the call coordinator 104, which may be a conventional controller, such as a PC controlled by a Pentium™ processor.

In a preferred embodiment of the invention, call coordinator 104 runs on a distributed switching system implemented using a so-called softswitch known to the art. Alternatively, call coordinator 104 may run on the well known NO. 5ESS switching system or a conventional router, in which, in either case, the completion (routing) of the call uses an external process that controls the functions performed by a conventional "soft" or "hard" switch within communications network 103.

As shown in FIG. 1, call coordinator 104 may access different network databases 106-1 through 106-n via directory controller 105. Directory controller 105 manages the databases 106 in a conventional manner. Directories 106 include, inter alia, (a) so-called "legacy" directories containing, e.g., toll free numbers; (b) so-called "emerging" directories such as Lightweight Directory Access Protocol (LDAP) directories containing information relating to addressing in communications network 100; (d) directories accessed using the calling party Identification (ID) information to obtain an address that identifies a respective calling party server 107 associated with the completion of the calling party's call. The identified calling party server 107, in accordance with an aspect of the invention, implements the calling party's subscription of services. (Note that the server 107 will also be referred to herein as the "calling party service 107 or just service 107".) Such services that are used to complete a call are known in the art and are typically implemented on a softswitch, e.g., softswitch 103. If a directory 106 does not contain such an address, then call coordinator 104 may execute a conventional default service to assist in the completion of the call.

Call coordinator 104 is assisted by calling party server 107 in completing the communications requested by the calling party. For example, calling party service 107 may contain the calling party's personal directory, which may be used with voice recognition (or a screen/display interface) to facilitate the completing establishing and completing the communications. Service 107 may allow the call to be associated with other services, e.g., multimedia services, priority calling, restrictions, or international dialing, etc. After interacting with the calling party and the respective CPE 101, calling party service 107 determines the network address assigned to the called party and passes that address to call coordinator 104. Call coordinator 104 then queries directory controller 105 to obtain the identity/address of the called party's server 108. (Note that the called party server 108 will also be referred to herein as the "called party service 108 or just service 108".) The called party service 108 manages inbound communications directed to the called party as well as the called party's preferences, location and addresses, etc. Called party service 108 may do so solely on behalf of the called party or interact with the called party to determine the way in which the inbound communications should be processed. Service 108 may be different from service 107, a different instance of the same service, or the identical service running on the same host. Call coordinator 104 communicates with the called party's service 108 to (a) inform the latter of the inbound communication, (b) pass thereto the caller identity and address of the calling party service 107 and (c) request instructions to determine the way in which the call ought to be completed, all in accordance with various aspects of the invention. The called party's service 108 then communicates with the calling party's service via a direct channel 109 of a packet network, such as, e.g., the well-known IP network, to obtain information which the called party may use to determine whether or not to accept (answer) the inbound communication. Such information may include (a) information personal to the calling party, (b) basis for the call, (c) priority level, (d) mailbox and/or voice mail addresses, and/or (d) the feature capabilities of the calling party terminal 101. The information may also include security information, such as a security certificate and call charging information that governs the way in which the call will be billed, i.e., either to the calling or called party. Also, the communications channel between the two services may be used to schedule a call back when a call cannot be completed, or the called party is unavailable. After communicating with the calling party service 107, the called party service 108 instructs call coordinator 104 where to complete the call. The instructions may also include a quality of service request as well as billing information, such as authorization to forward the call to a particular address, e.g., telephone number.

Figure 2:
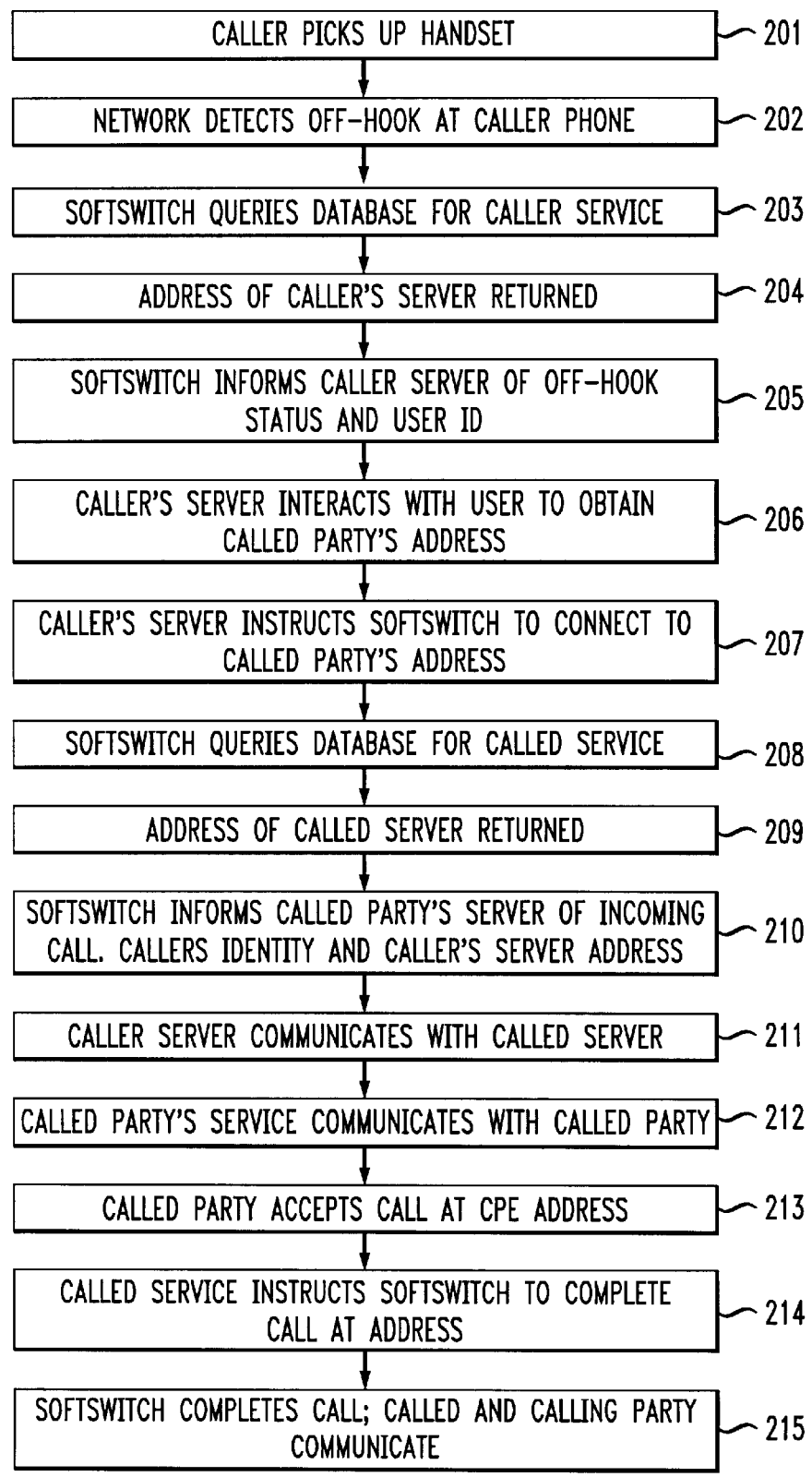
FIGS. 2–4 illustrates in flow chart form the various method steps that the system of FIG. 1 implements in accordance with the principles of the invention.

FIG. 2 illustrates in flow chart form the way in which system 100 completes a voice communication, starting with the calling party initiating a voice communication (block 201). Communication network 103 recognizes the request for service (block 202) and, using the calling party ID information (e.g., telephone number), queries data base 106 via directory controller 105 to obtain the caller's service (block 203). If the caller/user subscribes to a service, directory controller 105 returns the address of that service (block 204). Call coordinator 105 then invokes the identified service 107 and passes the caller's ID to the invoked service (block 205) and requests call-processing instructions. The calling party service 107 (block 206) may then use the softswitch 103 to (a) obtain the dialed digits of the called number using digit detection; or (b) transmit a prompt to the caller requesting the name/label of the called party and use conventional voice recognition capabilities to recognize the caller's utterance of a desired name/label. This interaction between calling party service 107 and the caller results in calling party service 107 (block 207) instructing softswitch 103 to establish a connection to the desired called address, e.g., a telephone number. Armed with the called party's address, softswitch 103, rather than completing the connection, first determines if the called party also subscribes to a service that manages the called party's communications. Accordingly, softswitch 103 (block 208) sends a query requesting the identity/address of the called party's service to call coordinator 104. Call coordinator 104, in turn, passes the query to directory controller 105 and returns (block 209) the address of the called party service, if any, to the softswitch. Assuming that the called party subscribes to such a service, then softswitch 103 (block 210) sends a message to service 108 identifying the inbound communications and containing the address of the calling party as well as the address of the calling party's service 107. At that point, the called party's service 108 communicates in a conventional manner with the calling party's service via packet network 109 to enable the two services to set up the call (block 211). Such communications may include the calling party information, such as, for example, business affiliation and interest, corporate personal web location, and possibly acceptance of charges for forwarding the call to a particular station, e.g., wireless station 101-2 (FIG. 1). Such information allows the calling party's service 107 to communicate (block 212) with the called party service 108 in an efficient and complete manner, as well as provide authorization for call billing. As part of the foregoing process, the calling party may redirect the call to an address where the called party is currently located, or use a conventional "find me" search process to obtain potential addresses. Alternatively, the called party service may simply return a request to send a message and the address of the called party's unified messaging box. The calling party, on the other hand, may also interact with a screen displayed on PC 102-1 to specify an address and/or other information. Assume that the called party accepts the call (block 213), in which the called party service 108 instructs softswitch 103 to complete the call to a specified address (block 214). The softswitch 103 (block 215) then completes the call.

Figure 3:
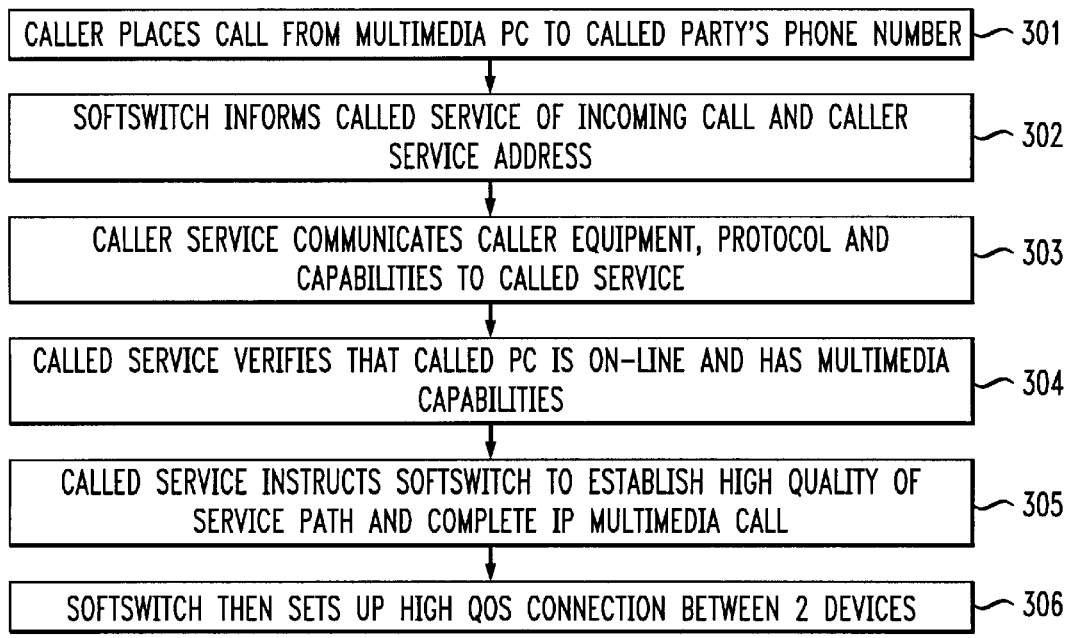

FIG. 3 illustrates in flow chart form the way in which system 100 determines the characteristics of a call when the caller uses a multimedia PC 102-1 with voice over IP (VOIP), FIG. 1, and having collaborative software installed therein, for example, the well-known Microsoft NETMEET-ING™ software, to place a call (block 301) to the called party's office telephone number. Using the method of FIG. 2, softswitch 103 locates and then notifies (block 302) the calling party's service 107 and called party's service 108 of the incoming call request. Called party service 108 (block 303) then communicates with calling party service 107 via network 109 to exchange the capabilities/characteristics of CPE 102-1 and CPE 102-2. The exchange may deal with a subset of such capabilities, such as disabling video, but enabling speech and other shared collaborations. When services 107 and 108 verify that both parties have multimedia capabilities (block 304), it then (block 305) instructs softswitch 103 via call coordinator 104 to make the call a multimedia call with a high quality of service between the calling and called devices. Softswitch 103 (block 306) then chooses the best route for the call and establishes a connection between the calling and called devices.

Figure 4:
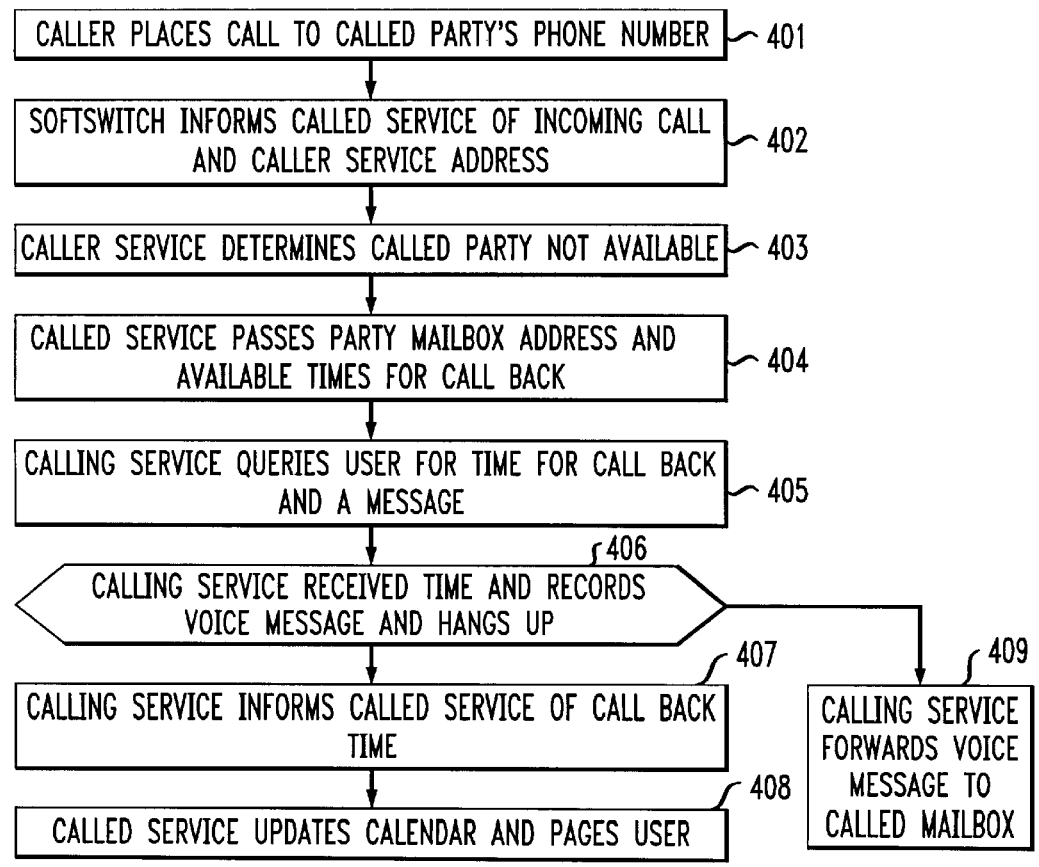

FIG. 4 is a system flowchart illustrating the way in which system 100 processes an incomplete communication and establishes a so-called "delayed completion", all in accordance with various aspects of the invention. Specifically, in accordance with the method of FIG. 2, the calling party (block 401) attempts to place a call to the called party using calling party service 107. Softswitch 103 (block 402) then informs called party service 108 of the incoming call and passes the calling party's address and the address of the calling party service 107 to service 108. Assume that the called service 108 determines, as a result of either (a) direct instruction from the called party prior to the call, (b) direct interaction with the called party, or (c) a failure to locate the called party, that the called party is unavailable (block 403). However, if called party service 108 recognizes that the calling party is of some importance (has a particular level of priority, sometimes referred to as "call screening") and has been instructed to schedule a return to such a person, then called party service 108 (block 404) passes to calling party service 107 via packet network 109 a calendar of the various times of day that the called party will be available as well as the called party's E-mail address (block 404). Calling party service 107 then forwards the calendar to the calling party and then interacts with the calling party via call coordinator 104 and softswitch 103 to determine a desired time for placing a call back (block 405) to the called party. When the calling party enters such a time and records a message for the called party and then disconnects (block 406), calling party service 107 confirms the call-back time with called party service 108. Called party service 108 then updates the called party's calendar accordingly to record the call back and then informs the called party. Calling party service 107 (block 409) then informs the calling party's recorded message into a suitable packet message and sends the packet message to the called party's E-mailbox using a standard message transfer format such as VPIM.

It will be appreciated that, although the invention illustrated herein is described in the context of a specific illustrative embodiment, those skilled in the art will be able to devise numerous alternative arrangements which, although, not explicitly shown or described herein, nevertheless, embody the principles of the invention and are within its spirit and scope.

What is claimed is:

1. A method of operating a communications network, wherein a call coordinator performs the steps comprising:
    a. receiving a call request for a call from a calling party to a called party;
    b. accessing a directory database and obtaining, based on calling party identifying information, the address of a calling party server implementing calling party services for outbound call managements;
    c. accessing the calling party server and invoking the calling party services wherein the calling party server interacts with the calling party to obtain a network address for the called party
    d. accessing a directory database and obtaining, based on the called party address, the address of a called party server implementing called party services for inbound call management, and communicating to the called party server information identifying the calling party and a network address of the calling party server; and
    e. obtaining call completion instructions from the called party server for the requested call based on call management information exchanged between the called party server and the calling party server to implement the calling party services and the called party services.

2. The invention of claim 1, further comprising completing the call in accordance with the call completion instructions.

3. The invention of claim 1, wherein the exchange of communications between the calling party server and the called party server occurs over a packet network that is different from the communications network over which the requested call is to be completed.

4. The invention of claim 1, wherein the call completion instructions include instructions as to where to complete the requested call.

5. The invention of claim 1, wherein the call completion instructions include instructions as to billing for the requested call.

6. The invention of claim 1, wherein the call completion instructions include instructions as to quality of service for the requested call.

7. Communications network apparatus comprising:
    a. a call coordinator disposed in a communications network element;

b. a calling party server implementing calling party services for outbound call management on behalf of a calling party;

c. a called party server implementing called party services for inbound call management on behalf of a called party; and d. at least one directory database adapted to return the address of a server implementing call management services on behalf of a party in response to information identifying the party, wherein, in response to a call request for a call from a calling party to a called party, the call coordinator accesses a directory database and obtains, based on calling party identifying information, the address of the calling party server; the call coordinator accesses the calling party server and invokes the calling party services; the calling party server interacts with the calling party to obtain the address of the called party, and provides the called party address to the call coordinator; the call coordinator accesses a directory database and obtains, based on called party address, the address of the called party server; the call coordinator informs the called party server of the calling party's identity and the address of the calling party server; and the called party server and the calling party server exchange call management information based on the calling party services and the called party services to generate call completion instructions for the requested call.

8. The invention of claim 7, wherein the call completion instructions include instructions as to where to complete the requested call.

9. The invention of claim 7, wherein the call completion instructions include instructions as to billing for the requested call.

10. The invention of claim 7, wherein the call completion instructions include instructions as to quality of service for the requested call.

11. The invention of claim 7, wherein the communications network element in which the call coordinator is disposed is a softswitch.

12. The invention of claim 7, wherein the calling party services include one or more of voice recognition services that recognizes the calling party's utterance of a name or label identifying the called party, calling party's communications equipment capabilities defining services, multimedia services, priority calling services, and personal called telephone numbers directory services.

13. The invention of claim 7, wherein the called party services include one or more of personalized rolodex service, called party's communications equipment capabilities defining services, public encryption key services, identity authentication services, call screening services, and multimedia services.

14. The invention of claim 7, wherein the calling party services include return call scheduling services, and the called party services include calendar communication services.

15. The invention of claim 1, wherein the calling party services include one or more of voice recognition services that recognizes the calling party's utterance of a name or label identifying the called party, calling party's communications equipment capabilities defining services, multimedia services, priority calling services, and personal called telephone numbers directory services.

16. The invention of claim 1, wherein the called party services include one or more of personalized rolodex service, called party's communications equipment capabilities defining services, public encryption key services, identity authentication services, call screening services, and multimedia services.

17. The invention of claim 1, wherein the calling party services include return call scheduling services, and the called party services include calendar communication services.

* * * * *